May 25, 1937.  A. JOHNSON  2,081,817

FISHHOOK HOLDER

Filed Oct. 5, 1936

Andrew Johnson
INVENTOR

BY Victor J. Evans & Co.
ATTORNEYS

Patented May 25, 1937

2,081,817

UNITED STATES PATENT OFFICE 2,081,817

FISHHOOK HOLDER

Andrew Johnson, Butte, Mont.

Application October 5, 1936, Serial No. 104,135

2 Claims. (Cl. 43—32)

The invention relates to a fish hook holder and more especially to a fish hook fastener for use upon a hat or body wearing apparel.

The primary object of the invention is the provision of a device of this character, wherein one or more fish hooks can be conveniently held when not attached to a fishing line so that such hooks will be readily and easily accessible for use, the device being of novel construction and when the fish hooks are held therein there will be no liability of the same inflicting injury to the possessor thereof and such hooks will be held in order while not in use.

Another object of the invention is the provision of a device of this character, wherein the same can be worn upon a hat or upon a garment worn by a person or within a box and when the fish hooks are engaged therein the same will be held in order so that they can be selected for use with dispatch and without injury to a person by contact with the bill or point of the hook, the gut, cord, string or the like being also held when the hook is not in use.

A further object of the invention is the provision of a device of this character, which is simple in construction, thoroughly reliable and efficient in operation, susceptible of holding different sizes of fishing hooks, light in weight yet strong, durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing.

Similar reference characters indicate corresponding parts throughout the several views in the drawing.

Figure 1:
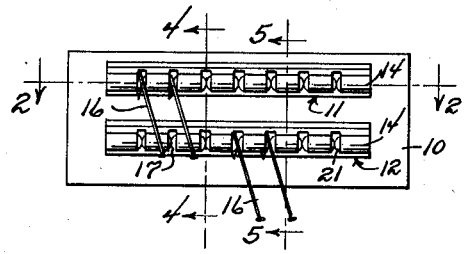
Figure 1 is an elevation of a device constructed in accordance with the invention showing fish hooks held thereby.
Figure 2:
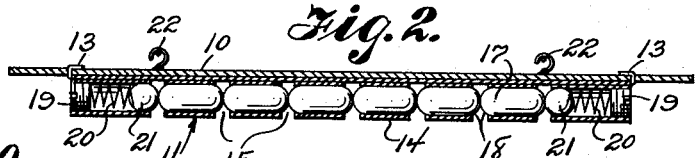
Figure 2 is an enlarged sectional view on the line 2—2 of Figure 1 looking in the direction of the arrows.

Referring to the drawing in detail, particularly Figures 1 to 5 inclusive, the device comprises a body plate 10 preferably flat and of elongated formation, being made from rust-proof sheet metal and is of the required size. On the outer or exposed side of the plate 10 is superposed a pair of spaced parallel hangers 11 and 12, respectively, these being made secure and fixed relative to the said plate 10 by securing ears 13 which are passed through the plate, that is to say, suitable slots therein and clenched against the rear or back face of such plate. These hangers have rolled therefrom tubular barrels 14, each being transversely slotted to provide spaced gaps or openings 15 of varying sizes with respect to each other for accommodating therein different sizes of fish hooks, the fish hooks being indicated at 16. Slidably fitted in each barrel 14 are latching members 17, each formed with a semi-spherical end 18 and are adapted for contact at these ends with each other to intersect the slots or openings 15 and function to hold the fish hooks 16 engaged in said slots or openings. Fitted in the outer ends of each barrel are screw plugs 19 against which play coiled expansion springs 20, these acting upon spherical or ball members 21 which play against the members 17 for urging the same into latching position and with the semi-spherical ends contacting with each other midway of the openings or slots 15. Thus the hooks 16 when latched can be frictionally released from the slots or openings 15 by the passage of the hook between the members 17 adjacent to and contacting with each other at such slot or opening 15.

On the rear face of the plate 10 and made permanent thereon is a pair of safety pins 22 which are for the purpose of fastening the plate upon a hat or on a garment. Thus fish hooks can be conveniently carried upon the hat or the garment and are readily accessible for use when in the device, such hooks being held in order and enabling selecting of the desired hook at will.

Figure 7:
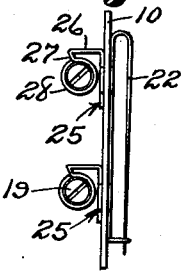
Figure 7 is an end elevation of a slight modification.

In Figure 7 of the drawing there is shown a slight modification wherein the hanger 25 is formed with an upper outwardly directed right angular ledge 26 having an inwardly inclined portion 27 joined with the barrel 28.

Figure 8:
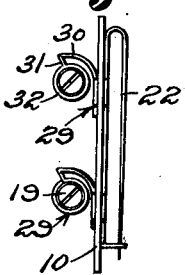
Figure 8 is a view similar to Figure 7 showing a further modification.

In Figure 8 of the drawing there is shown a further modification wherein the hanger 29 has the rounded upwardly and forwardly directed upper portion 30 with the inwardly inclined portion 31 carrying the barrel 32.

Figure 9:
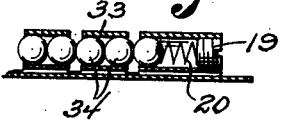
Figure 9 is a fragmentary horizontal sectional view showing a further modification.

In Figure 9 of the drawing there is shown a further modification wherein the barrel 33 carries a series of spherical or ball members 34, these being in substitute for the members 17.

Figure 10:
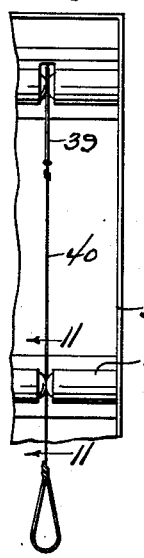
Figure 10 is a fragmentary plan view of a further modification.
Figure 3:
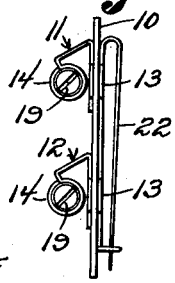
Figure 3 is an end elevation.
Figure 4:
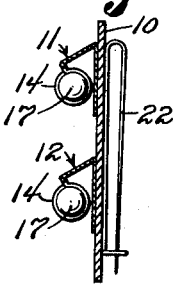
Figure 4 is a sectional view on the line 4—4 of Figure 1.
Figure 5:
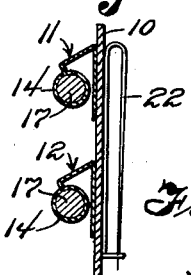
Figure 5 is a sectional view on the line 5—5 of Figure 1 looking in the direction of the arrows.
Figure 11:
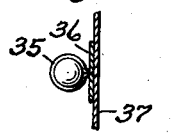
Figure 11 is a sectional view on the line 11—11 of Figure 10 looking in the direction of the arrows.
Figure 6:
Figure 6 is a front elevation of one of the barrels of the device.

In Figures 10 and 11 of the drawing there is shown a still further modification wherein the barrels 35 through the hangers 36 are attached to strips 37 in substitute for the plate 10 and these strips are arranged in spaced parallel relation permanently within a box body, a portion thereof being indicated at 38 and in this arrangement the device will not only hold the hook 39 but also the gut, string, cord or the like constituting the leader 40 attached to such hook, this being an example of a fly hook.

The fish hooks when within the device will be orderly held and will be readily and conveniently accessible for use.

It is to be understood, of course, that in lieu of spherical or ball members both in the preferred and modified forms there can be substituted round end pins which will function for the same purpose as the said members 21.

What is claimed is:

1. A device of the character described comprising a flat support, a barrel suspended by said support and having spaced transverse openings, latching means held within the barrel, and means urging said means in contact with each other at the openings in said barrel.

2. A device of the character described comprising a flat support, a barrel suspended by said support and having spaced transverse openings, latching means held within the barrel, means urging said means in contact with each other at the openings in said barrel, and fastening means carried by said support, the said latching means including a plurality of separable members for contact with each other.

ANDREW JOHNSON.